US005733460A

United States Patent [19]
Rothenberg et al.

[11] Patent Number: 5,733,460
[45] Date of Patent: Mar. 31, 1998

[54] USE OF HYDROXAMATED POLYMERS TO ALTER BAYER PROCESS SCALE

[75] Inventors: Alan S. Rothenberg, Wilton; Peter V. Avotins, Easton, both of Conn.; Robert Cole, Portland, Tex.; Frank Kula, Danbury, Conn.

[73] Assignee: Cytec Technology Corp., Wilmington, Del.

[21] Appl. No.: 639,466

[22] Filed: Apr. 29, 1996

[51] Int. Cl.$^6$ .......................... C02F 5/10
[52] U.S. Cl. ................ 210/698; 210/701; 423/121; 423/122
[58] Field of Search .................. 210/698, 701; 423/121, 122, 130

[56] References Cited

U.S. PATENT DOCUMENTS

| | | | |
|---|---|---|---|
| 3,345,344 | 10/1967 | Fetscher | 260/78.4 |
| 4,480,067 | 10/1984 | Vio et al. | 524/446 |
| 4,532,046 | 7/1985 | Meunier et al. | 210/698 |
| 4,536,296 | 8/1985 | Vio | 252/8.5 C |
| 4,587,306 | 5/1986 | Vio et al. | 525/354 |
| 4,767,540 | 8/1988 | Spitzer et al. | 210/728 |
| 5,027,891 | 7/1991 | Fulford et al. | 423/121 |
| 5,308,498 | 5/1994 | Fong et al. | 210/697 |
| 5,415,782 | 5/1995 | Dimas | 210/698 |
| 5,516,435 | 5/1996 | Lewellyn | 423/121 |

FOREIGN PATENT DOCUMENTS

| | | | |
|---|---|---|---|
| 0582399A2 | 8/1992 | European Pat. Off. | C01F 7/06 |
| 0586070A2 | 8/1992 | European Pat. Off. | C01F 7/06 |

*Primary Examiner*—Peter A. Hruskoci
*Assistant Examiner*—Betsey J. Morrison
*Attorney, Agent, or Firm*—Pennie & Edmonds LLP

[57] ABSTRACT

The processing of bauxite in the Bayer Process results in the formation of titanaceous, siliceous, and other scale on equipment and apparatus such that a great deal of time and effort is spent in order to maintain the process at its height efficiency by reducing or eliminating the same. The scale is treated, reduced, altered, etc., according to the present invention by the use of hydroxamated polymers having weight average molecular weights of over about 10,000.

15 Claims, No Drawings

USE OF HYDROXAMATED POLYMERS TO ALTER BAYER PROCESS SCALE

BACKGROUND OF THE INVENTION

The Bayer Process for the purification of bauxite in the production of aluminum is well recognized. It is the most widely used process in the world and its process details are a matter of public knowledge.

During the processing of the bauxite in the Bayer Process, certain insoluble species are produced which have a tendency to deposit as scale on the walls of apparatus and equipment used in the process, such as pipes, digesters, pumps, heat exchangers, etc. These species include titanates, silicates, trihydrates and the like. The silicates in the form of insoluble sodium aluminosilicates are often called DSP, desilication products. These species differ from plant-to-plant and from ore-to-ore and, in addition to existing as scale, exist in contaminant quantities in various streams of the process. The presence of these species is detrimental to the operation of the Bayer Process in that they constitute process losses. Additionally, scale deposition on equipment, apparatus, etc., such as on the walls of the tubes of heat exchangers, digesters and pipes substantially reduce their efficiency in that the flow of process streams through pipes is seriously impeded and the transfer of heat to the process stream is decreased. Currently, the removal of scale is accomplished by chemical means such as dissolution with acid or alkali or by manual means such as jackhammers, dynamite, etc., which is very cost intensive.

Efforts have been also initiated by commercial plants to find solutions to the problem of scale such as dilution, precipitation, etc., and by modifying the conditions under which certain stages of the Bayer Process are conducted.

For example, EPO Application No. 0582399A2 teaches the use of ammonium compounds, aromatic amine compounds and other amine compounds, all of specific formula, to alter silicious materials in the Bayer Process. Exemplary additives are tetramethylammonium hydroxide; amino tri (methylene) phosphoric acid; tripropylamine and the like. Similarly, in EPO Application No. 0586070 A2, polymeric quaternary ammonium compounds and polyamine compounds such as poly DADMACs and polyacrylamides are employed to alter siliceous materials in the Bayer Process liquors.

SUMMARY OF THE INVENTION

The instant invention relates to the use of hydroxamic acid or salt group containing polymers having a weight average molecular weight of over about 10,000 to treat Bayer Process liquors containing a scale forming component so as to alter the morphology of said component and/or the scale formed thereby, thereby reducing the amount of scale formation and/or enhancing the removal of existing scale in Bayer Process apparatus and equipment.

The use of hydroxamic group containing polymers to eliminate the scaling by deposit of alkaline earth compounds such as those containing calcium, barium, etc., from an aqueous medium is taught in U.S. Pat. No. 4,532,046. The patentees, however, do not indicate that these polymers are useful in the treatment of Bayer Process streams which involve titanates, silicates, etc., and which are at high temperature and pH, e.g. over 14.

Hydroxamic acid polymers are also known to be useful as corrosion inhibitors for use in, for example, industrial cooling waters which contain hardness, see U.S. Pat. No. 5,308,498; however, the inhibition of corrosion in iron and steel alloys is attributable again to the presence of alkaline earth compounds, i.e., those containing calcium, magnesium, etc.

Additionally, high molecular weight polymers containing hydroxamic acid or salt groups are known to be effective flocculants in the Bayer Process for the removal of suspended solids, see U.S. Pat. No. 4,767,540. This patent however does not indicate that the polymers disclosed therein are effective for scale alternation or deposition inhibition.

DESCRIPTION OF THE INVENTION INCLUDING PREFERRED EMBODIMENTS

The present invention resides in a method of treating Bayer Process liquor containing a scale forming component which comprises adding to a Bayer Process slurry mixer, digester, flash tank, sand trap cyclone or charge or recycle stream leading thereto, an effective scale inhibiting amount of a hydroxamic acid or salt group containing polymer having a weight average molecular weight of over about 10,000.

The hydroxamic acid or salt group containing polymer can vary broadly in type and should be sufficiently stable to be effective under the high temperatures, e.g. 100–290° C. and strong caustic conditions, e.g. 80 to 400 g./l. total alkali content expressed as sodium carbonate equivalent.

Any water-soluble hydroxamic acid or salt group containing polymer may be used, especially those containing pendant groups of the formula:

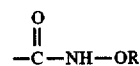

where R is hydrogen or a cation. The polymers can be derived from pendant ester, amide, anhydride, nitrile, etc., group containing polymers by the reaction thereof which a hydroxylamine or salt thereof.

Exemplary of polymers which may be reacted to impart the pendant hydroxamic acid or salt group thereon include acrylic, methacrylic, crotonic, etc., acid ester polymers such as those made from methyl acrylate, ethyl acrylate, t-butylacrylate, methyl methacrylate, ethyl methacrylate, cyclohexyl methacrylate, dimethyl aminoethylacrylate, methyl crotonate, etc; polymers of maleic anhydride and its esters; nitrile polymers such as those produced from acrylonitrile, methacrylonitrile; acrylamide polymers such as those produced from acrylamide, methacrylamide, etc., or copolymers terpolymers of the above esters, nitriles and amides, etc.

The hydroxamic acid or salt group containing polymers are well known in the art as exemplified by U.S. Pat. Nos. 3,345,344; 4,480,067; 4,532,046; 4,536,296; and 4,587,306, all of which are hereby incorporated herein by reference. The general procedure for their preparation comprises reacting the polymer containing the pendant reactive group, in solution, with a hydroxylamine or its salt at a temperature ranging from about 10° C. to about 100° C. for several hours at elevated pH. From about 1 to about 90% of the available pendant reactive groups of the polymer may be replaced by the hydroxamic acid or salt groups in this manner. The polymer to be hydroxamated may, in addition to being used in the form of an aqueous solution, be used in the form of a latex or an inverse emulsion. For example, an aqueous solution of an acrylamide or an acrylamide and a comonomer e.g. acrylic acid can be added to a hydrocarbon oil in the presence of an appropriate emulsifier to provide a water-inoil emulsion wherein the oil is the continuous phase and the monomer solution is the discontinuous phase. Polymerization of the monomer results in a water-in-oil emulsion wherein the oil is the continuous phase and the polymer solution is the discontinuous phase. Subsequent hydroxamation of the polymer results in a water-in-oil emulsion of the hydroxamated polymer which may be used as such in the present invention or inverted into water to form a dilute aqueous solution of hydroxamated polymer useful herein.

The polymers useful herein should contain a degree of hydroxamation ranging from about 1 to about 90 mole percent, preferably from about 5 to about 75 mole percent, and most preferably from about 10 to about 50 mole percent.

Suitable hydroxylamine salts include the sulfates, sulfites, phosphates, perchlorates, hydrochlorides, acetates, propionates, etc., the reaction media being adjusted in pH to from about 3 to 14, preferably over 7.0 by means of acid or base addition to the solution.

Any water-soluble polymer may be used in the present process provided that it, after hydroxamation, performs to alter the morphology of the existing scale or scale forming component in the liquor thereby reducing the amount of scale formed and/or enhancing the removal of existing scale in the Bayer Process apparatus or equipment. Preferred polymers are copolymers of (alk) acrylamide with up to 95 mole percent of acrylic acid, sodium acrylate, methacrylic acid, methylacrylate, etc.

The weight average molecular weight of the polymers useful in the present invention must be over about 10,000, preferably over about 100,000 and more preferably over about 1 million.

The hydroxamated polymer may be added directly to the apparatus, equipment, etc., in which the formation of scale is to be inhibited, modified, etc., such as the slurry mixers, digesters, flash tanks, and sand trap cyclones. It is preferred, however, that the hydroxamated polymer be added to a charge stream or recycle stream or liquor leading to any of this apparatus or equipment.

The amount of hydroxamated polymer added depends primarily on the content of the liquor involved and generally all that is required is a scale inhibiting amount thereof. Generally, however, at least about 0.1 mg. of the hydroxamated polymer per liter of the liquor should be used, preferably at least about 1.0 mg./liter.

Higher or lower amounts of hydroxamated polymer than set forth above may be used and still fall within the scope of the present invention.

The following examples are set forth for purposes of illustration only and are not to be construed as limitations on the present invention except as set forth in the appended claims. All parts and percentages are by weight unless otherwise specified.

EXAMPLE 1

Titanate Scale

A series of laboratory digestions is carried out with varying levels of hydroxamated polymers added to a prepared slurry. For each digestion, 125 grams of bauxite are placed in a digestion bomb along with one liter of alumina plant test tank liquor having a specific gravity of 1.269 g/L, and varying amounts of a hydroxamated polymer. The hydroxated polymer has a weight average molecular weight of about 350,000 and contains about 65% hydroxamate functional groups. The digestion bomb is sealed and heated to 143° C. for 15 minutes. After cooling to about 90° C., the bomb is opened and the resulting slurries are filtered. The filtrates are placed in storage vessels and monitored for precipitation of scale on the walls of the storage container. The results are set forth immediately below.

| Example | Polymer Dosage | Scale |
| --- | --- | --- |
| 1A | 0 | Very heavy, thick scaling on all surfaces |
| 1B | 20 ppm | Light scaling on sides of container |
| 1C | 100 ppm | None |

EXAMPLE 2

Titanate Scale Reduction

Small amounts of Rutile (8 mg) and clay flotation rejects containing Anatase (148 mg) are added to ca. 30 ml Bayer Process spent liquor and boiled for 1 hour. A 10 ml portion from each is filtered through a .45 micron millipore filter along with a blank and 0.5 ml of 0.1% hydroxamated polyacrylamide (HP) having a molecular weight of about 500,000 is added to each of the remaining 20 ml solutions and boiled for an additional 20 minutes. Another 10 ml is filtered and the filtered sample analyzed for Ti.

| Sample | PPM Ti in Liquor | PPM Ti in Liquor with HP |
| --- | --- | --- |
| Blank | <0.1 | — |
| Rutile | 0.4 | 1.0 |
| Anatase | 0.6 | 2.3 |

The 0.4 and 0.6 ppm Ti values are near the limits of solubility for Ti in this system. The higher values in the HP treated solutions show that titanium is being stabilized in solution and will have less tendency to precipitate in process equipment as a titanate scale.

We claim:

1. A method of treating Bayer Process liquor containing a scale forming component which comprises at least one material selected from the group consisting of titanates, silicates, and trihydrates, the method comprising adding to the liquor within a Bayer Process slurry mixer, digester, flash tank, sand trap cyclone, or to a charge or recycle stream leading thereto, an effective scale inhibiting or scale modifying amount of a hydroxamic acid or salt group containing polymer having a weight average molecular weight over about 10,000, and a degree of hydroxamation of at least 10 mole percent, in order to inhibit the scale forming components from depositing on Bayer Process equipment.

2. A method according to claim 1 wherein said polymer is added to a Bayer Process liquor within a slurry mixer.

3. A method according to claim 1 wherein said polymer is added to a Bayer Process liquor within a digester.

4. A method according to claim 1 wherein said polymer is added to a Bayer Process liquor within a flash tank.

5. A method according to claim 1 wherein said polymer is added to a Bayer Process liquor within a sand trap cyclone.

6. A method according to claim 1 wherein said polymer is added to a charge to the digester.

7. A method according to claim 1 wherein said polymer is added to a stream being recycled to digestion.

8. A method according to claim 7 wherein said recycle stream is a spent liquor.

9. A method according to claim 1 wherein said molecular weight is over 1 million.

10. A method according to claim 10 wherein said molecular weight is over 10 million.

11. The method of claim 1, wherein the scale forming component is a sodium aluminosilicate.

12. The method of claim 1, wherein the hydroxamic acid or salt group containing polymer is stable at a temperature of from about 190° to about 290° F.

13. The method of claim 1, wherein the hydroxamic acid or salt group containing polymer is stable in a caustic liquor having a total sodium carbonate equivalent alkali content of from about 80 to about 400 grams per liter.

14. A method of reducing the formation of scale upon Bayer Process equipment which comprises adding to a Bayer Process liquor within a slurry mixer, digester, flash tank, sand trap cyclone or to a charge or recycle stream leading thereto, an effective scale inhibiting amount of a hydroxamic acid or salt group containing polymer having a weight average molecular weight over about 10,000, and a degree of hydroxamation of at least 10 mole percent, wherein the scale comprises at least one material selected from the group consisting of titanates, silicates, and trihydrates.

15. A method of enhancing the removal of scale from Bayer Process equipment which comprises adding to a Bayer Process liquor within a slurry mixer, digester, flash tank, sand trap cyclone or to a charge or recycle stream leading thereto, an effective scale morphology altering amount of a hydroxamic acid or salt group containing polymer having a weight average molecular weight of over about 10,000, and a degree of hydroxamation of at least 10 mole percent, wherein the scale comprises at least one material selected from the group consisting of titanates, silicates, and trihydrates.

* * * * *